United States Patent
Mikhail et al.

(10) Patent No.: US 8,333,196 B2
(45) Date of Patent: Dec. 18, 2012

(54) COOLING MODULE AND METHOD, AND APPARATUS EMBODYING SUCH A COOLING MODULE

(75) Inventors: Noya Mikhail, Weiβenbrunn (DE); Rolf Sebastian, Marktschorgast (DE); Carsten Stuka, Leupoldsgrün (DE)

(73) Assignee: Siemens Aktiengesellschaft, Munich (DE)

( * ) Notice: Subject to any disclaimer, the term of this patent is extended or adjusted under 35 U.S.C. 154(b) by 465 days.

(21) Appl. No.: 12/447,990

(22) PCT Filed: Oct. 30, 2007

(86) PCT No.: PCT/EP2007/009384
§ 371 (c)(1),
(2), (4) Date: Jan. 15, 2010

(87) PCT Pub. No.: WO2008/052735
PCT Pub. Date: May 8, 2008

(65) Prior Publication Data
US 2010/0108299 A1    May 6, 2010

(30) Foreign Application Priority Data

Oct. 31, 2006 (DE) ............ 20 2006 016 812 U
Jul. 19, 2007 (DE) ............ 10 2007 033 548

(51) Int. Cl.
*A62B 7/00* (2006.01)

(52) U.S. Cl. .................... 128/204.15

(58) Field of Classification Search ........... 165/80.2, 165/200, 104.33; 361/695, 699; 128/204.15
See application file for complete search history.

(56) References Cited

U.S. PATENT DOCUMENTS

| | | | |
|---|---|---|---|
| 7,934,539 B2 * | 5/2011 | Wei | 165/80.2 |
| 2003/0037912 A1 | 2/2003 | Stauter et al. | |
| 2005/0095121 A1 | 5/2005 | Vithani | |

FOREIGN PATENT DOCUMENTS

| | | |
|---|---|---|
| DE | 20 2005 014 383 U1 | 2/2006 |
| WO | WO 2005/124249 A1 | 12/2005 |

* cited by examiner

*Primary Examiner* — Manuel Mendez
(74) *Attorney, Agent, or Firm* — Schiff Hardin LLP

(57) ABSTRACT

The cooling module (2) is provided in particular for the internal cooling of a medical device (20) and is constructed as an assembled unit, with a coolant conveyed in a primary-side coolant circuit, with an air-water heat exchanger (8), with a ventilator (6) for generating a secondary-side airstream for cooling using the air-water heat exchanger (8), and with a controller (18A, 18B) for controlling the operation of the cooling module (2), wherein at least a major part of the controller is integrated in the ventilator (6) as a partial control unit (18A). The partitioning of the controller achieves an efficient use of space within the cooling module (2) in such a way that an optimal use of space is obtained in a restricted assembly space for the cooling module (2), and the air-water heat exchanger (8) can be made comparatively large. The speed of the airflow through the air-water heat exchanger (8) can therefore be reduced while the cooling power remains constant, such that the risk of entrainment of condensate droplets is reduced.

13 Claims, 1 Drawing Sheet

COOLING MODULE AND METHOD, AND APPARATUS EMBODYING SUCH A COOLING MODULE

BACKGROUND OF THE INVENTION

1. Field of the Invention

The present invention concerns a cooling module, an apparatus with such a cooling module and a method for internally cooling an apparatus with the use of such a cooling module.

2. Description of the Prior Art

As used herein, the term cooling module means an internally closed and functional installation or assembly that internally contains all components joined together that are required to conduct the desired cooling. A heat exchanger unit with which air is cooled by means of water is therefore provided within such a cooling module.

Such cooling modules provided as assemblies can be used in versatile ways for cooling of rooms, apparatuses, etc. without additional installation expenditure, or with only small installation expenditure.

If such modules are used for cooling, in particular for internally cooling electrical and/or mechanical apparatuses, only a limited structural space is often available. However, the cooling capacity of a cooling module—which is provided for internal air cooling of an apparatus, for example, wherein the internal air to be cooled is conducted through an air-water heat exchanger of the cooling module—also significantly depends on the cooling surface of the air heat exchanger, and therefore overall on the structural size of the cooling module.

Particularly in highly developed technical apparatuses in which multiple, highly sensitive components to be cooled are arranged, a reliable, consistent cooling is necessary in spite of a limited structural space. Such is the case, for example, in the cooling of medical apparatuses, in particular treatment apparatuses such as x-ray apparatuses, magnetic resonance apparatuses, etc. In such radiation-generating and radiation-detecting apparatuses that serve to generate image data, a defined and precise cooling to a constant temperature is a prerequisite for the diagnosis images acquired with the medical apparatuses to exhibit the desired high quality, for example.

SUMMARY OF THE INVENTION

An object of the present invention is to enable a good cooling capacity given only a small structural volume.

This object is achieved according to the invention by a cooling module, such as for the internal cooling of an (advantageously medical) apparatus, fashioned as an installation unit with a coolant directed in a primary coolant circuit, which has a gas-liquid heat exchanger, a ventilator to generate a secondary air flow to be cooled by the gas-liquid heat exchanger, and a controller to control the operation of the cooling module. In the cooling module at least a majority of the controller is integrated into the ventilator as a sub-control unit. In particular water or an alcohol-water mixture is used as a coolant. The gas-liquid heat exchanger is subsequently designated as an air-water heat exchanger.

It is of particular importance for those components of the controller that take up a large structural volume to be placed in the ventilator. Namely, in cooling modules that have previously typically been used, control units are provided that are typically integrated into an electrical box of the cooling module. These electrical boxes have a relatively large volume. Given a cramped installation situation, this leads to the situation that the remaining cooling module (in particular the air exit nozzles) must be fashioned smaller. Essential components of the controller that advantageously together take up more than 50% (and in particular even up to 80%) of the structural volume of the controller are henceforth separated from this control unit and integrated in a space-saving manner into the ventilator. The remaining components of the controller are, for example, further integrated as a second sub-control unit into an electrical box that is then significantly smaller.

The portion of the controller with the largest structural volume is represented by the control components required to control the ventilator. in accordance with the invention, the control components required for the control of the ventilator can be integrated into the ventilator in a space-saving manner by an appropriate construction design of the ventilator. The overall control for the cooling module is therefore divided into multiple (advantageously two) sub-control units that are arranged distributed in the cooling module in a space-saving manner. A predetermined structural space can be utilized as optimally as possible via this measure. In particular, a predetermined free cross-sectional area is nearly entirely available for the air transport so that this can be fashioned increased in size in comparison to previously typically cooling modules.

A significant advantage of the enlarged design of the air-water heat exchanger is apparent in the reduction of the flow speed of the air that is connected with this given the same cooling capacity. Namely, due to the reduction of the flow speed of the air the danger that condensation drops forming at the air heat exchanger detach and are carried away by the air current is reduced. Such condensation drops could lead to significant disruptions in the operation of the technical apparatus. A better condensation dissipation is therefore achieved, and the danger of the formation of what is known as spray condensation (thus condensation drops that are entrained) is reduced.

As used herein, the term ventilator means a structural unit composed of a drive unit and a rotor unit with multiple rotor blades that is driven by said drive unit. According to an embodiment of the invention, the sub-control unit is integrated into the drive unit of the ventilator.

In a further embodiment the drive unit is arranged at (and advantageously in) a rear wall of an outer housing of the cooling module. The air heat exchanger, which covers substantially the entire cross-sectional area of the external housing (i.e. almost completely fills the space), is arranged opposite the drive unit. A large cooling effect is thereby achieved with the least possible space demand. All (or at least nearly all) additional components for the water circuit are hereby preferably arranged alongside the air-water heat exchanger in a space-saving manner. Given the arrangement of the drive unit within the rear wall, the drive unit pierces the rear walls so that cooling fins (arranged on the back side of the drive unit, for example) are located outside of the cooling module.

For an optimally efficient and reliable cooling in another embodiment the controller is fashioned as a whole such that a pre-dehumidification is initially conducted in the initial start-up before the normal cooling operation is started. In the pre-dehumidification, moisture is initially extracted from the air before the actual normal cooling of the air to be cooled is set into operation. Given use in a medical apparatus, this pre-dehumidification is advantageously conducted before the actual initial start-up of the medical apparatus. In the case of a medical apparatus, this means that the pre-dehumidification is initially conducted with the aid of a cooling module before the actual electrical components of the apparatus that are to be cooled are activated. This is based on the consideration that such apparatuses are also used in regions or climate zones that have a high humidity. If the cooling module were immediately set into operation with the normal cooling capacity in a high humidity, this would lead to a very high condensation formation, which would cause the sensitive cooling capacity to be reduced. Due to the pre-dehumidification, relatively dry air is to be cooled so that less condensate accrues, and a faster and more efficient cooling is thereby achieved.

In an embodiment, the pre-dehumidification is implemented such that the ventilator is operated with a reduced rotation speed (compared to normal operation) with simultaneously high and advantageously maximal coolant throughput through the air-water heat exchanger. For this purpose, the rotation speed of the ventilator is advantageously reduced such that the transported air volume flow is reduced form 100% to 25 to 35% in comparison to the normal operation.

According to a preferred development, the control unit is furthermore fashioned such that a drying is conducted during shutdown. Given use in a technical apparatus, this in particular means that the cooling module is operated in a special drying mode after the deactivation of the individual electrical apparatuses to be cooled or, respectively, during their shutdown. The internal air located inside the apparatus is dried by this drying, meaning that humidity is extracted. The apparatus is therefore dried downstream by this additional drying at the end of the operation until a relative humidity is achieved that is advantageously selected such that an algae or bacterial growth is prevented. A negative health effect is thereby prevented, in particular in the medical field as well as in the field of food technology, or in the cooling of rooms in which people reside.

The implementation of the drying conveniently proceeds such that the ventilator is operated with high rotation speed with reduced coolant throughput in comparison to normal operation. In comparison with normal operation, the air volume flow is hereby set to above 100% (normal operation being 100%). At the same time, the coolant throughput is selected such that the cooling capacity is reduced to 20 to 30% in comparison to normal operation, and preferably to zero or nearly zero (normal operation being 100% cooling capacity). For this purpose, the ventilator is advantageously operated with maximal rotation speed given minimal coolant throughput or, respectively, without coolant throughput through the air-water heat exchanger.

The object is furthermore achieved according to the invention by an electrical or mechanical apparatus (in particular a medical treatment apparatus, and advantageously a diagnostic apparatus to generate diagnostic images) embodying such a cooling module for internally cooling the internal air of the apparatus. The internal space of the apparatus is formed by an enclosed structural space in which the individual electrical components to be cooled are arranged. This enclosed structural space is typically formed by a housing that is not sealed entirely airtight, such that a certain amount of air exchange with the environment can occur, such that atmospheric moisture can also enter into the internal space.

The object is furthermore achieved according to the invention by a method for internally cooling such an apparatus with such a cooling module.

The advantages and preferred embodiments described above regard to the cooling module are also applicable to the apparatus and to the method. The cooling module is connected with the apparatus enclosure by a control line so that the cooling module controls its cooling capacity independently, by means of the control unit integrated into the cooling module, depending on the operation of the apparatus.

The specific embodiments with regard to the pre-dehumidification as well as with regard to the drying can also in principle be executed in multiple sub-control units, independent of the division of the control unit.

DESCRIPTION OF THE PREFERRED EMBODIMENTS

Figure 1:
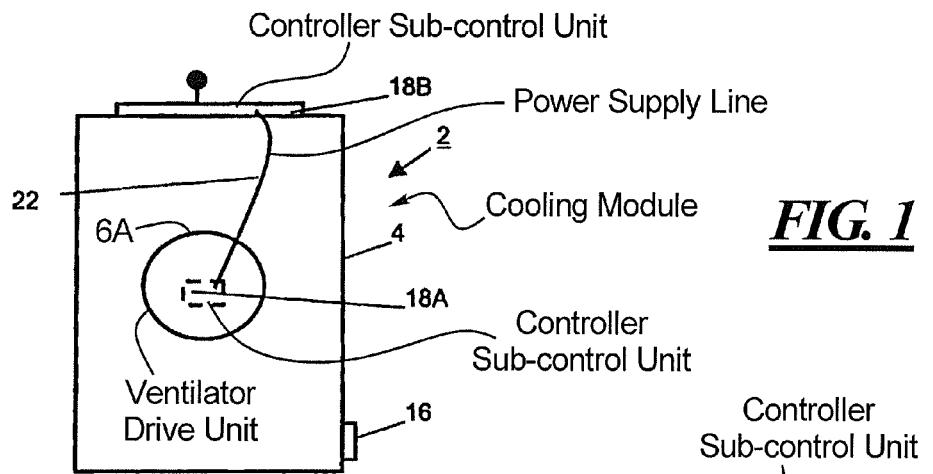
FIG. 1 is a rear view of a cooling module in accordance with the present invention.
Figure 2:
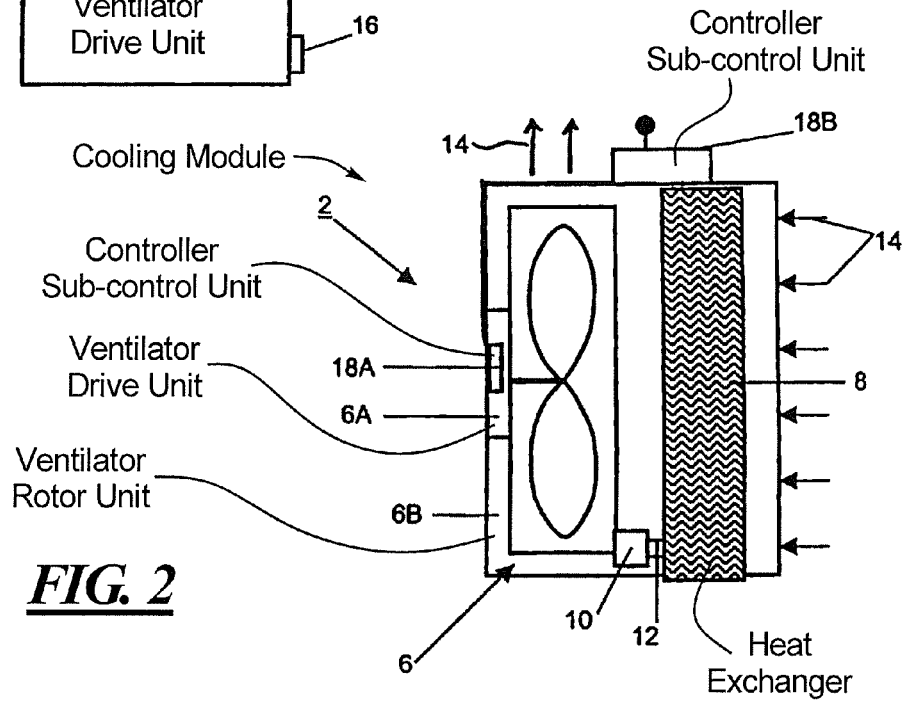
FIG. 2 shows a side view, in section, of the cooling module of FIG. 1.

A cooling module 2 shown in FIGS. 1 and 2 has an outer housing 4 in which all components of a cooling circuit that are required for a cooling are arranged. These components include a ventilator 6, an air-water heat exchanger 8 and the additional components 10 (namely 3-port directional control valves, sensors, condensation pumps) that here are represented together simply as boxes. In a pipeline system 12 a coolant (water or ethylene-water mixture) is directed through these individual components. The air-water heat exchanger 8 is therefore connected with the additional components 10 via the pipeline system 12. The air heat exchanger 8 is in particular what is known as a plate heat exchanger. The coolant directed through the components 10 and the air heat exchanger 8 forms the primary side of a coolant circuit. On the secondary side of the coolant circuit, an air to be cooled is drawn into the outer housing 4 via corresponding housing openings, flows through the air heat exchanger 8 in the flow direction 14 and subsequently leaves the outer housing 4 again as cooled air via an air exit (not shown in detail).

The ventilator 6 has a drive unit 6A with an electromotor as well as a rotor unit 6B. The ventilator 6 is advantageously fashioned altogether as a radial flow compressor. It penetrates a rear wall of the outer housing 4 with the housing of its drive unit, such that this projects at least slightly beyond the rear wall with its back side.

Devices to capture and discharge condensation are additionally, advantageously provided within the cooling module 2 in order to be able to discharge in a targeted manner a condensate accruing in operation. These components are, for example, a capture pan for condensation that is arranged below the air-water heat exchanger, a condensation pump and a connection 16 via which the condensate can be discharged. Multiple different connections can be provided via the connection 16, for example connections for linking with the pipeline system 12 so that the coolant can be circulated with the aid of external pumps or even be exchanged and refilled for maintenance purposes.

The cooling module 2 as a whole has a controller that is divided into different sub-control units 18A, 18B. The operation and the function of the entire cooling module 2 is controlled via the controller. The control unit is advantageously connected with a superordinate control unit of a technical apparatus 20 that should be cooled with the cooling module 2. This means that the cooling module-specific controller with the sub-control units 18A, 18B controls the cooling module 2 depending on the operation of the technical apparatus 20. In particular, the air flow volume is set by the cooling module-specific controller by the adjustment of the rotation speed of the ventilator 6, and the coolant throughput through the air heat exchanger 8 per time unit is set by a corresponding 3-port directional control valve.

It is now of particular importance that the controller is divided into the sub-control units 18A, 18B, wherein the sub-control unit 18B is integrated into the display unit 6A of the ventilator 6 and, for example is directly mounted on the electromotor. This sub-control unit 18A encompasses the primary components of the entire controller. These primary components are hereby necessary for the ventilator 6 and directly integrated into the drive unit 6A. The components of the sub-control unit 18A are mounted on a common circuit board. The sub-control unit 18A is connected with the second sub-control unit 18B via a data and power supply line 22.

Figure 3:
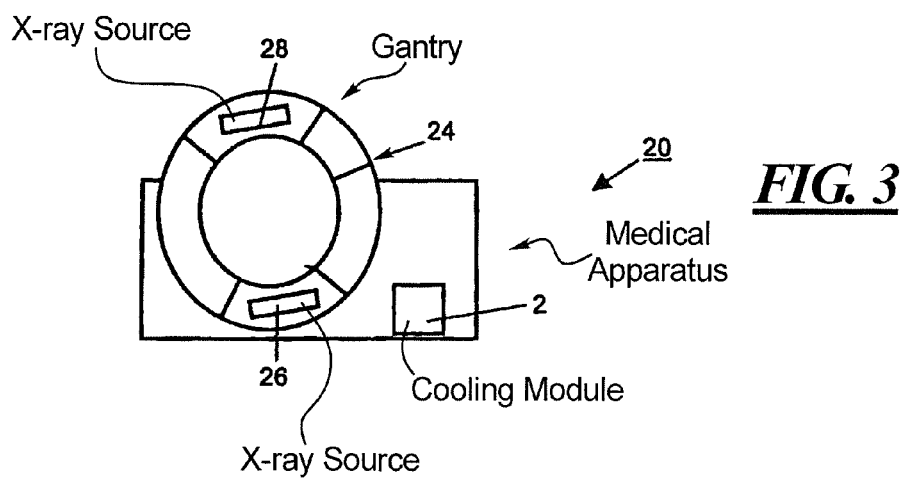
FIG. 3 shows a simplified schematic front view of a computed tomography apparatus embodying a cooling module in accordance with the present invention.

Such a cooling module as is shown simplified in FIGS. 1 and 2 is in particular provided for arrangement in the medical apparatus 20 shown in FIG. 3. The apparatus 20 (shown significantly simplified) is, for example, a computer tomograph with a gantry 24. An x-ray detector 26 and an x-ray source 28 as essential components are arranged in the annular space of the gantry 24. The cooling module 2 is arranged within the apparatus 20. The cooling module is therefore an integral component of the apparatus 20 and is not externally visible to the user. The cooling module 2 cools the internal air in the gantry 24 in that this is drawn in via the ventilator 6 and is cooled in the cooling module 2 via heat exchange at the air-water heat exchanger 8 before it leaves the cooling module 2 again. The cooled air is supplied to the gantry (and the components 26, 28 arranged therein) via air conductor components (not shown in detail here). The air conductor components therefore connect the cooling module with the gantry 24.

The controller of the cooling module 2 is advantageously designed for three different operating modes, namely for normal operation, for a pre-dehumidification and for a drying. The individual operating modes are hereby automatically activated by the controller depending on the current operation of the medical apparatus 20. In normal operation of the cooling module, the medical apparatus is likewise in normal operation, meaning the individual electrical components 26, 28 are in operation and must be cooled. In this normal cooling operation a defined rotation speed of the ventilator 6 as well as a defined coolant throughput through the air-water heat exchanger 8 are set depending on the current requirements.

A pre-dehumidification is respectively conducted before starting normal operation, meaning that the internal air in the gantry 24 is dehumidified via the cooling module (meaning that air moisture is extracted from the internal air) in the start-up of the medical apparatus, thus before image acquisitions ensue, for example. For this the ventilator is operated with a rotation speed that is reduced in comparison to normal operation and at simultaneously higher (in particular maximal) coolant throughput. A very high latent cooling capacity is achieved via this measure, such that a large amount of condensate accumulates. If the normal operation—in which the air volume flow, the cooling capacity and the condensation accumulation are respectively normalized to 100%—is assumed as a normalization standard, in the operation of the pre-dehumidification the air volume flow is set to only 25 to 35%. At the same time the cooling capacity is set to a value from 140 to 150%. The condensate accumulation hereby increases to 650 to 700%. The reduction of the air volume flow ensues through reduction of the rotation speed of the ventilator and the increase of the cooling power by increasing the coolant throughput through the air heat exchanger.

The pre-dehumidification ensures that the necessary, sensitive cooling capacity at a constant level is achieved very quickly and reliably in the actual transition into normal operation for the electrical components 26, 28.

The drying operating mode is activated when the apparatus 20 is taken out of operation, thus when the electrical components 26, 28 are deactivated. The cooling module runs afterwards in the drying mode. In this mode an air volume flow that is increased in comparison to normal operation is set given reduced cooling capacity, thus an increased rotation speed given lower coolant throughput. In particular, the cooling capacity is set to zero in that the coolant throughput through the air heat exchanger is set to zero. An air volume flow of $\geqq 100\%$ and a cooling capacity at 0 is hereby set relative to the normal operation as a normalization standard. The internal parts of the cooling module are dried. This occurs over a period of time set in the controller.

Although modifications and changes may be suggested by those skilled in the art, it is the intention of the inventors to embody within the patent warranted heron all changes and modifications as reasonably and properly come within the scope of their contribution to the art.

The invention claimed is:

1. A cooling module comprising:
   an installation unit configured for placement in an internally closed space of a mechanical or electrical apparatus;
   said installation unit comprising a primary coolant circuit in which coolant flows;
   a gas-liquid heat exchanger connected to said coolant circuit; and
   a ventilator disposed relative to said heat exchanger to cause a secondary airflow through the heat exchanger, said airflow being an airflow that is to be cooled, and a controller that controls all components of the installation unit, said controller being mechanically integrated as a sub-control unit into the ventilator.

2. A cooling module as claimed in claim 1 wherein said ventilator comprises a drive unit, and wherein said sub-control unit is integrated into said drive unit.

3. A cooling module as claimed in claim 2 wherein said installation unit comprises a housing having a rear wall, said drive unit being located at said rear wall opposite said heat exchanger, and wherein said heat exchanger substantially covers an entire cross-sectional area of said housing.

4. A cooling module as claimed in claim 1 wherein said controller operates said components to implement a pre-humidification cycle before operating said components to cool said airflow.

5. A cooling module as claimed in claim 4 wherein said controller is configured to implement said pre-dehumidification cycle by operating said ventilator with a reduced rotational speed in comparison to operation of said ventilator for cooling said airflow, and by operating said heat exchanger with a higher coolant throughput compared to operation of said heat exchanger for cooling said airflow.

6. A cooling module as claimed in claim 1 wherein said controller is configured to implement a drying cycle during a shutdown phase of cooling said airflow.

7. A cooling module as claimed in claim 6 wherein said controller is configured to implement said drying cycle by operating said ventilator with a higher rotational speed compared to operation of said ventilator for cooling said airflow, and by operating said heat exchanger with a reduced coolant throughput in comparison to operation of said heat exchanger for cooling said airflow.

8. An electrical or mechanical apparatus comprising:
   a plurality of apparatus components;
   a housing forming an enclosed space in which said plurality of components are contained; and a cooling module comprising an installation unit configured for placement in an internally closed space of a mechanical or electrical apparatus, said installation unit comprising a primary coolant circuit in which coolant flows, a gas-liquid heat exchanger connected to said coolant circuit, and a ventilator disposed relative to said heat exchanger to cause a secondary airflow through the heat exchanger, said airflow being an airflow that is to be cooled, and a controller that controls all components of the installation unit, said controller being mechanically integrated as a sub-control unit into the ventilator.

9. A method for internally cooling an electrical or mechanical apparatus comprising the steps of:
placing an installation unit in an internally closed space of a mechanical or electrical apparatus;
flowing cooling through said installation unit in a primary coolant circuit thereof;
connecting a gas-liquid heat exchanger to said coolant circuit; and
with a ventilator disposed relative to said heat exchanger, producing a secondary airflow through the heat exchanger, said airflow being an airflow that is to be cooled, and controlling all components of the installation unit with a controller, and mechanically integrating said controller as a sub-control unit into the ventilator.

10. A method as claimed in claim 9 comprising from said controller, operating said components to implement a pre-humidification cycle before operating said components to cool said airflow.

11. A method as claimed in claim 10 comprising from said controller, implementing said pre-dehumidification cycle by operating said ventilator with a reduced rotational speed in comparison to operation of said ventilator for cooling said airflow, and by operating said heat exchanger with a higher coolant throughput compared to operation of said heat exchanger for cooling said airflow.

12. A method as claimed in claim 9 comprising from said controller, implementing a drying cycle during a shutdown phase of cooling said airflow.

13. A method as claimed in claim 12 wherein said controller is configured to implement said drying cycle by operating said ventilator with a higher rotational speed compared to operation of said ventilator for cooling said airflow, and by operating said heat exchanger with a reduced coolant throughput in comparison to operation of said heat exchanger for cooling said airflow.

* * * * *